United States Patent
Krishnamurthy et al.

(10) Patent No.: US 12,361,269 B2
(45) Date of Patent: *Jul. 15, 2025

(54) LSTM CIRCUIT WITH SELECTIVE INPUT COMPUTATION

(71) Applicant: Intel Corporation, Santa Clara, CA (US)

(72) Inventors: Ram Krishnamurthy, Portland, OR (US); Gregory K. Chen, Portland, OR (US); Raghavan Kumar, Hillsboro, OR (US); Phil Knag, Hillsboro, OR (US); Huseyin Ekin Sumbul, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/237,887

(22) Filed: Aug. 24, 2023

(65) Prior Publication Data

US 2023/0401434 A1    Dec. 14, 2023

Related U.S. Application Data

(63) Continuation of application No. 16/583,201, filed on Sep. 25, 2019, now Pat. No. 11,790,217.

(51) Int. Cl.
| | |
|---|---|
| *G06N 3/063* | (2023.01) |
| *G06F 7/509* | (2006.01) |
| *G06F 7/523* | (2006.01) |
| *G06F 7/544* | (2006.01) |
| *G06F 9/30* | (2018.01) |
| *G06F 9/38* | (2018.01) |

(52) U.S. Cl.
CPC .......... *G06N 3/063* (2013.01); *G06F 7/5095* (2013.01); *G06F 7/523* (2013.01); *G06F 7/5443* (2013.01); *G06F 9/30098* (2013.01); *G06F 9/3893* (2013.01)

(58) Field of Classification Search
CPC ... G06F 7/5443; G06F 9/30098; G06F 9/3893
See application file for complete search history.

(56) References Cited

FOREIGN PATENT DOCUMENTS

| WO | 2018203170 A1 | 11/2018 |
| WO | 2019186309 A1 | 10/2019 |

OTHER PUBLICATIONS

First Office Action for U.S. Appl. No. 16/583,201, Mailed Aug. 2, 2022, 11 pages.
Notice of Allowance for U.S. Appl. No. 16/583,201, Mailed May 24, 2023, 8 pages.

*Primary Examiner* — Michael D. Yaary
(74) *Attorney, Agent, or Firm* — Compass IP Law PC

(57) ABSTRACT

An apparatus is described. The apparatus includes a long short term memory (LSTM) circuit having a multiply accumulate circuit (MAC). The MAC circuit has circuitry to rely on a stored product term rather than explicitly perform a multiplication operation to determine the product term if an accumulation of differences between consecutive, preceding input values has not reached a threshold.

18 Claims, 8 Drawing Sheets

LSTM CIRCUIT WITH SELECTIVE INPUT COMPUTATION

PRIORITY APPLICATION

This application claims the benefit of priority to U.S. Non-Provisional application Ser. No. 16/583,201, filed Sep. 25, 2019. The entire contents of which are incorporated herein by reference in its entirety.

FIELD OF INVENTION

The field of invention pertains generally to the computing sciences, and, more specifically, to a LSTM circuit with selective input computation.

BACKGROUND

Artificial intelligence, machine learning and/or other processes that execute over a neural network are receiving heightened attention in the technology industry. Neural networks can be numerically intensive, and, as such, semiconductor chip designers are looking for ways to reduce the intensity of their computations.

BRIEF DESCRIPTION OF THE FIGURES

A better understanding of the present invention can be obtained from the following detailed description in conjunction with the following drawings, in which.

DETAILED DESCRIPTION

Figure 1:
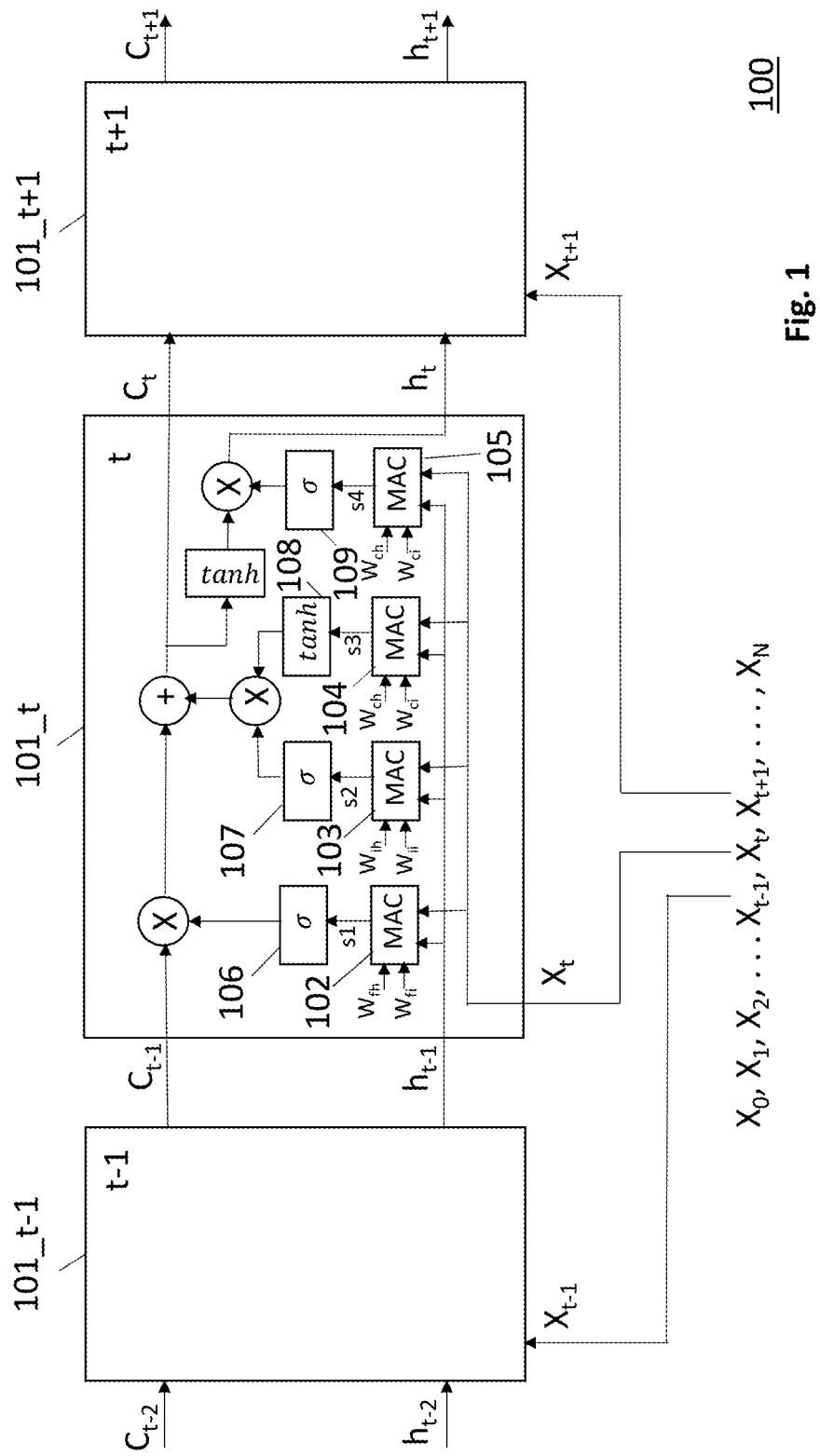
FIG. 1 shows a traditional LSTM circuit.

FIG. 1 shows a high level view of a recurrent neural network (RNN) implementation. As can be seen in FIG. 1, the RNN is implemented as a chain of Long Short-Term Memory (LSTM) cells. RNNs are particularly applicable for temporal workloads such as speech recognition and natural language processing. For such applications at least, the input workload can be viewed as a vector of samples or other elements of information, X, that are generated across a sequence timesteps. That is, multiple input elements are generated in dimension t, where, each value of t corresponds to a specific timestep ($x_{t-1}$ precedes $x_t$; $x_t$ precedes $x_{t+1}$, etc).

In the LSTM chain of FIG. 1, each cell operates on the input value for a specific value of t. That is, cell 101_$t$−1 operates in input $X_{t-1}$, cell 101_$t$ operates on input $x_t$, cell 101_$t$+1 operates on input $x_{t+1}$.

With respect to cell 101_$t$, cell 101_$t$ also receives the cell state ($C_{t-1}$) and hidden state ($h_{t-1}$) from the previous timestep's cell. From these inputs cell 101_$t$ generates a current cell state $C_t$ and a hidden state $h_t$ for the current timestep (t). The process then flows forward to the cell of the next time step 101_$t$+1 which operates on input $x_{t+1}$ and the cell and hidden states of the previous cell ($C_t$, $h_t$) to generate the cell state and hidden state of the next time step ($C_{t+1}$, $h_{t+1}$). After flowing information forward through a first vector of time stepped information X, the RNN can then proceed to process a next vector of time stepped information as described just above.

With respect to the specific operation performed by the cells, referring to cell 101_$t$, a first MAC unit 102 is used to calculate a first dot product of a "forget" weight vector ($W_{fh}$, Wfi) and a vector of the prior timestep's hidden state and the current timestep's input value ($h_{t-1}$,$x_t$). That is, a first MAC unit 102 calculates the scalar value s1=(($W_{fh}$)($h_{t-1}$))+(($W_{fi}$) ($x_t$)) which is used as input information for a first sigmoid function 106 (where, e.g., the a sigmoid function calculates 1/(1+$e^{-s1}$). The output of the first sigmoid function 106 corresponds to a "forget gate" and may be latched into a state holding circuit (such as a register or flip flop) which has not been shown in FIG. 1 for illustrative ease.

Similarly, a second MAC unit calculates 103 the scalar value s2=(($W_{ih}$)($h_{t-1}$))+(($W_{ii}$)($x_t$)) where $W_{ih}$ and $W_{ii}$ are "input" weights. The output of the second MAC unit 103, s2, is presented to a second sigmoid function 107 whose output corresponds to an "input gate" (again, a state holding circuit that keeps the input gate is not illustrated). A third MAC unit 104 calculates the scalar value s3=(($W_{ch}$)($h_{t-1}$))+(($W_{ci}$)($x_t$)) where $W_{ch}$ and $W_{ci}$ are "cell" weights. The scalar value s3 is provided to a tan h function 108 which generates a value tan h(s3). The forget gate and previous cell state $C_{t-1}$ are then multiplied to produce a first product term and the input gate and tan h(s3) values are multiplied to produce a second product term. The first and second product terms are then added to produce the current cell state ($C_t$).

A fourth MAC unit 105 calculates the scalar value s4= (($W_{oh}$)($h_{t-1}$))+(($W_{oi}$)($x_t$)) where $W_{oh}$ and $W_{oi}$ are "output" weights. The output of the fourth MAC unit 105, s4, is presented to a third sigmoid function 109 whose output corresponds to an "output gate" (again a state holding circuit can hold the output gate). The output gate and the hyperbolic tangent of the current cell state (tan h($C_t$)) are multiplied to determine the current hidden state $h_t$.

Figure 2:
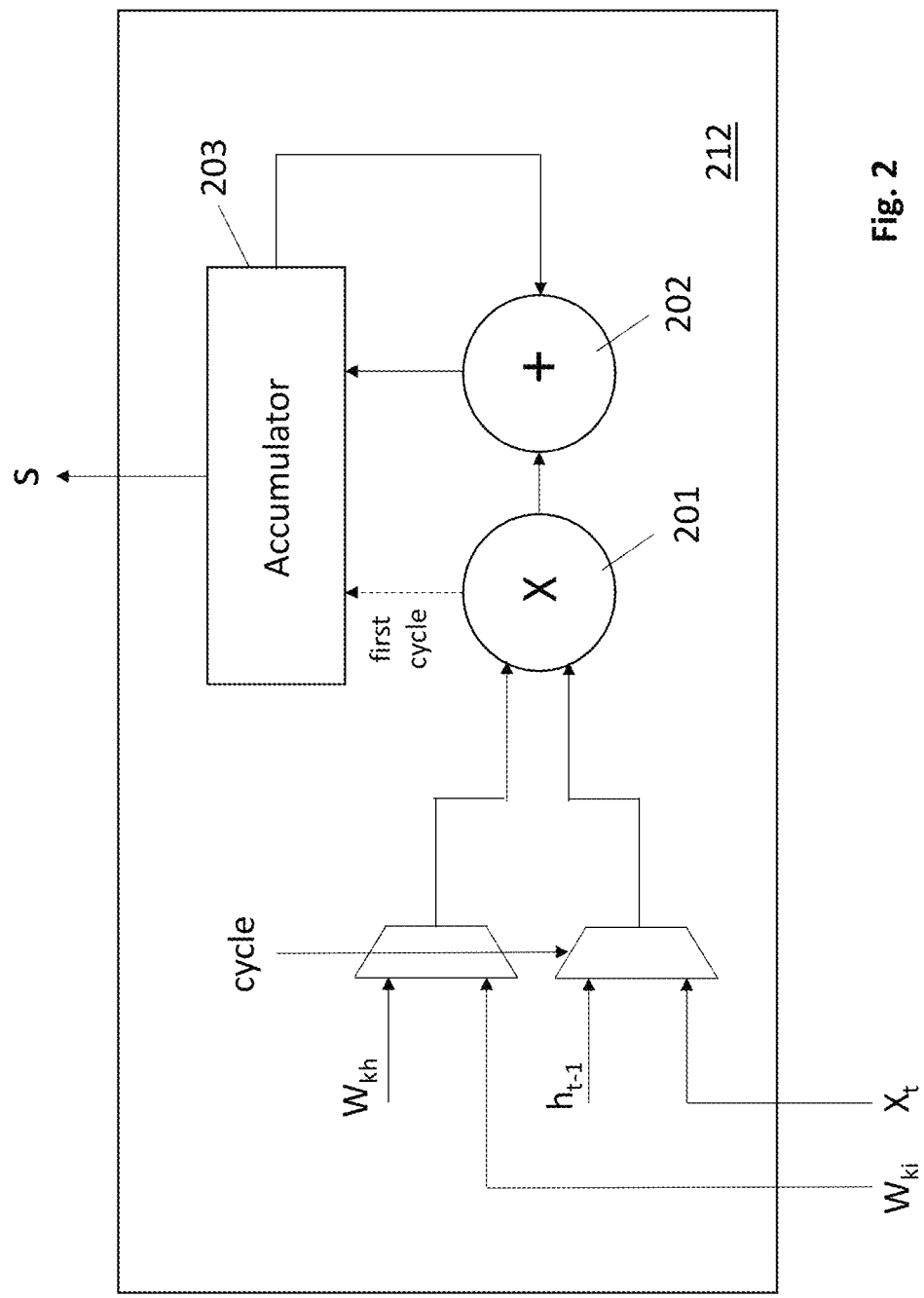
FIG. 2 shows a MAC circuit of the traditional LSTM circuit.

FIG. 2 shows a more detailed view of any of the MAC circuits 212 of FIG. 2. Here, note that the MAC 212 is depicted as being a sequential MAC having a single multiplier 201 and a single adder 202. Here, in order to perform the dot product that determines a particular output scalar value (s), the MAC 212 will perform a "loop" or "cycle" for each product term in the dot product. That is, for example, if MAC 212 of FIG. 2 corresponds to MAC 102 of FIG. 1, the multiplier 201 of the MAC will calculate the first product term (($W_{fh}$)($h_{t-1}$)) during a first cycle and then store that product term in the MAC's accumulator 203. The multiplier 201 of the MAC will next calculate the second product term (($W_{fi}$)($x_t$)) during a second cycle and add the second product term to the first product term that is stored in the accumulator to generate the s1 scalar. If x and/or h are vectors themselves the number of cycles increases with each element of the vector(s).

LSTM RNNs suffer from long latencies because of the long sequence lengths in the workloads (there can be many LSTM cells that need to execute per RNN). Making matters worse, in various applications (such as speech recognition inference tasks), the input information varies slowly in time and often has redundant values across multiple timesteps (the input value X hardly changes across time steps).

Said another way, $x_{t-1} \approx x_t$ across many consecutive time steps. As such, and because the aforementioned weights are not functions of t, each of the (($W_{fi}$)($x_t$)), (($W_{ii}$)($x_t$)), (($W_{ci}$) ($x_t$)), (($W_{oi}$)($x_t$)) multiply operations performed by the MACs 102, 103, 104, 105 during their respective calculations of s1, s2, s3 and s4 will largely re-calculate the same value over and over again across consecutive timesteps. As each multiply operation consumes noticeable power and time, repeatedly calculating the same product term over repeated, consecutive time steps can be viewed as an inefficiency that can be removed from the RNN's processing. In the case of a sequential MAC as described just above, the repeated calculation of a same product term wastefully consumes time and power, whereas, in the case of a vector MAC that has more than one multiplier to perform multiplications in parallel at least power is consumed unnecessarily.

Figure 3:
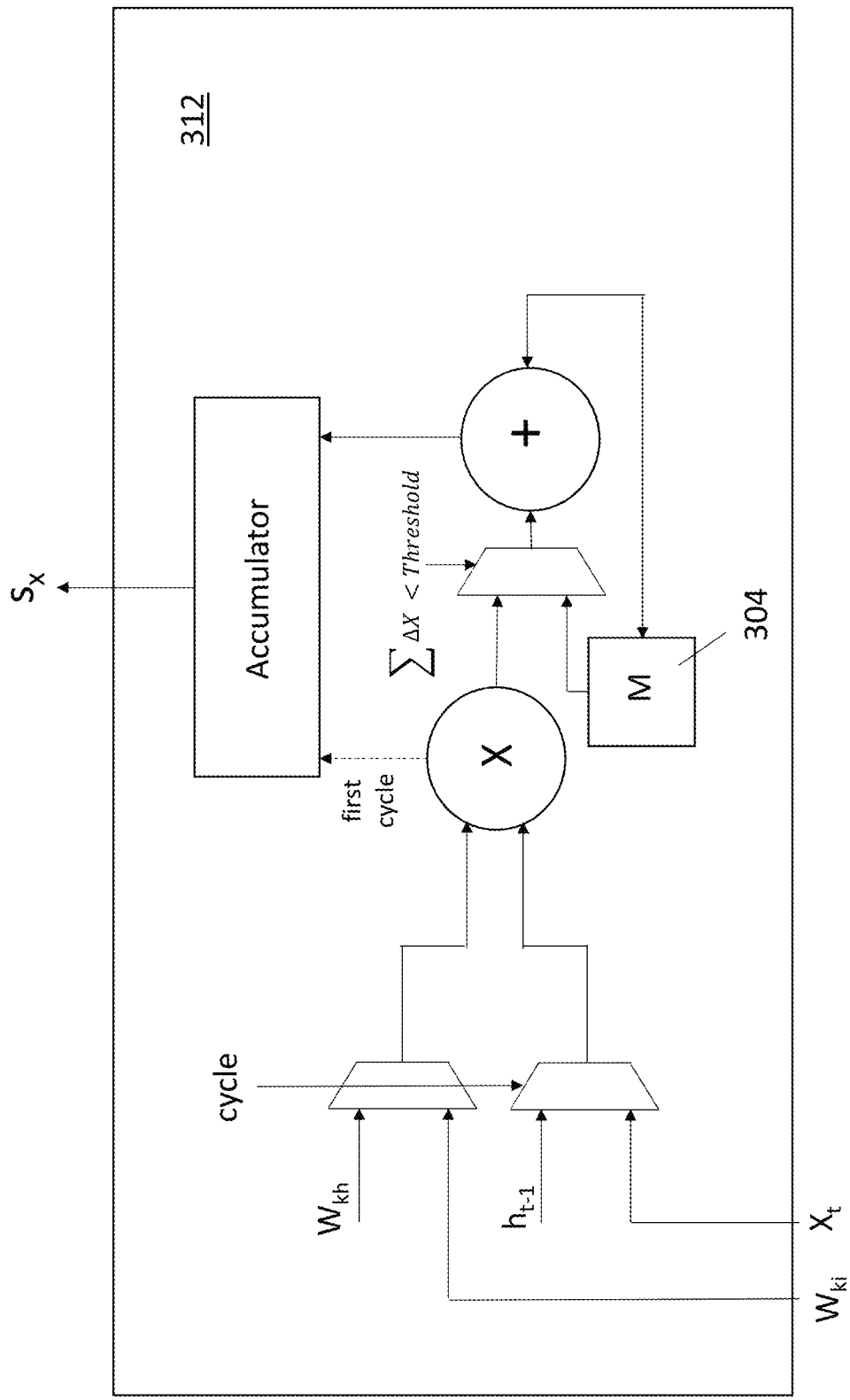
FIG. 3 shows an improved MAC circuit.

FIG. 3 therefore shows an improved MAC 312 that is embedded with or is otherwise coupled to memory and/or register space 304 that stores a previously calculated weight and input value product term so that the multiplication operation of the weight by the cell's current input value can be skipped (not performed). Specifically, if the accumulated difference between the "current" input value and the previous input value over the chain of cells that feed into the current cell is less than some threshold (e.g., $\Sigma |(xt)-(xt-1)| < threshold$), then, the MAC 312 will read the previously stored value from the memory/register space 304 (e.g., while the other product of the weight and previous cell's hidden state is being calculated by the multiplier) and simply add the previously stored value to the other product term to generate the corresponding scalar output s.

Said another way, when calculating its dot product, the MAC bypasses a multiplication operation if the difference between a cell's input value x and it's preceding cell's input value accumulated across the sequence of cells that lead into the current cell and instead uses the previously calculated $(W_{ki})(x_t)$ term (where k=f, i, g, o for forget, input, tan h and output scalars respectively) that is stored in the memory and/or register space 304.

If the accumulated differences of cell input values is greater than the threshold (e.g., (e.g., $\Sigma |(xt)-(xt-1)| > threshold$), then, the MAC will not bypass the multiplication operation and instead execute a standard MAC operation in which product terms are explicitly multiplied with the input data at hand. That is, the MAC will fully multiply $(W_{ki})$ and $(x_t)$ to generate a "fresh" or new $(W_{ki})(x_t)$ term. The freshly calculated $(W_{ki})(x_t)$ term is added to the corresponding $(W_{kh})(h_{t-1})$ term that is also freshly multiplied to generate the corresponding scalar value. Additionally, the freshly calculated $(W_{ki})(x_t)$ term is written into the memory/register space of the MAC so that it can be reused to obviate a multiplication operation for subsequent cells if their input value is within the threshold of their preceding cell's input value.

Once a fresh product has been multiplied and written into the memory 304, the accumulation of input value differences is reset and a new sequence of accumulating input value differences begins. Note that by accumulating input differences over a number of cells in the chain and then comparing the accumulation against a threshold, tight controls can be established as to what extent input values can vary before triggering a standard operation MAC rather than rely on a previously calculated value. Nevertheless, in cases where the input value does not change or hardly changes at all across an extended number of timesteps, the stored value can be relied upon for these extended number of timesteps.

Figure 4:
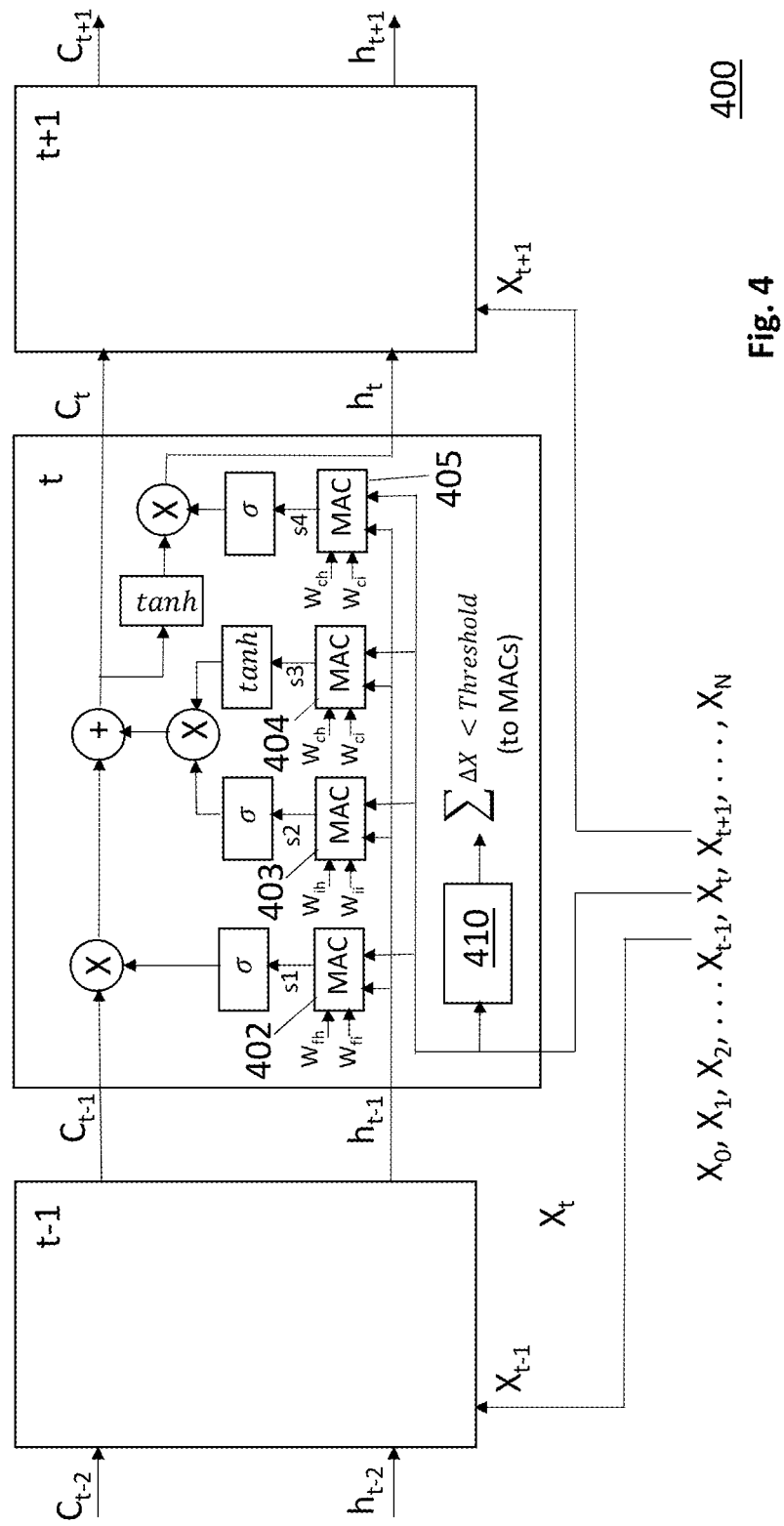
FIG. 4 shows an improved LSTM circuit that utilizes the MAC circuit of FIG. 3.

FIG. 4 shows a complete LSTM cell whose MAC circuits 402, 403, 404, 405 have been designed to rely on an internally saved $(W_{ki})(x_t)$ product term if x input values over multiple time steps do not sufficiently deviate to justify multiplying a new $(W_{ki})(x_t)$ product term as described just above with respect to FIG. 3. As can be seen in FIG. 4, apart from the MAC circuits 402, 403, 404, 405 each having access to a respective, stored product term, the LSTM cell also includes a circuit 410 for measuring accumulated differences between consecutive x input values over a sequence of consecutive time steps, and, comparing the accumulation to a threshold.

As discussed above, so long as the accumulation remains below the threshold, the MACs will rely on the product term that they stored at the onset of the current run of approximately same x input values. Once the accumulation extends over the threshold, each of the MACs calculate a fresh product term and store it. Meanwhile, the accumulation circuit resets itself (sets its accumulation value to zero) to restart a next sequence of accumulated consecutive x input differences.

Although FIG. 4 suggests an accumulation circuit 410 is within each LSTM circuit, if separate LSTM cell circuits are physically connected in series, one such circuit can provide the accumulation and threshold comparison for each of the LSTM cell circuits in the series. Various embodiments, however, are apt to re-use a single LSTM cell circuit over consecutive time steps. That is, the physical $C_t$ and $h_t$ outputs from the single LSTM cell are written to a memory/register circuit. Then, to process the next time step, these same values are read from the memory and used and provided to the $C_{t-1}$ and $h_{t-1}$ inputs of the cell. In this case, the LSTM cell includes an accumulation and comparison circuit 410.

Figure 5:
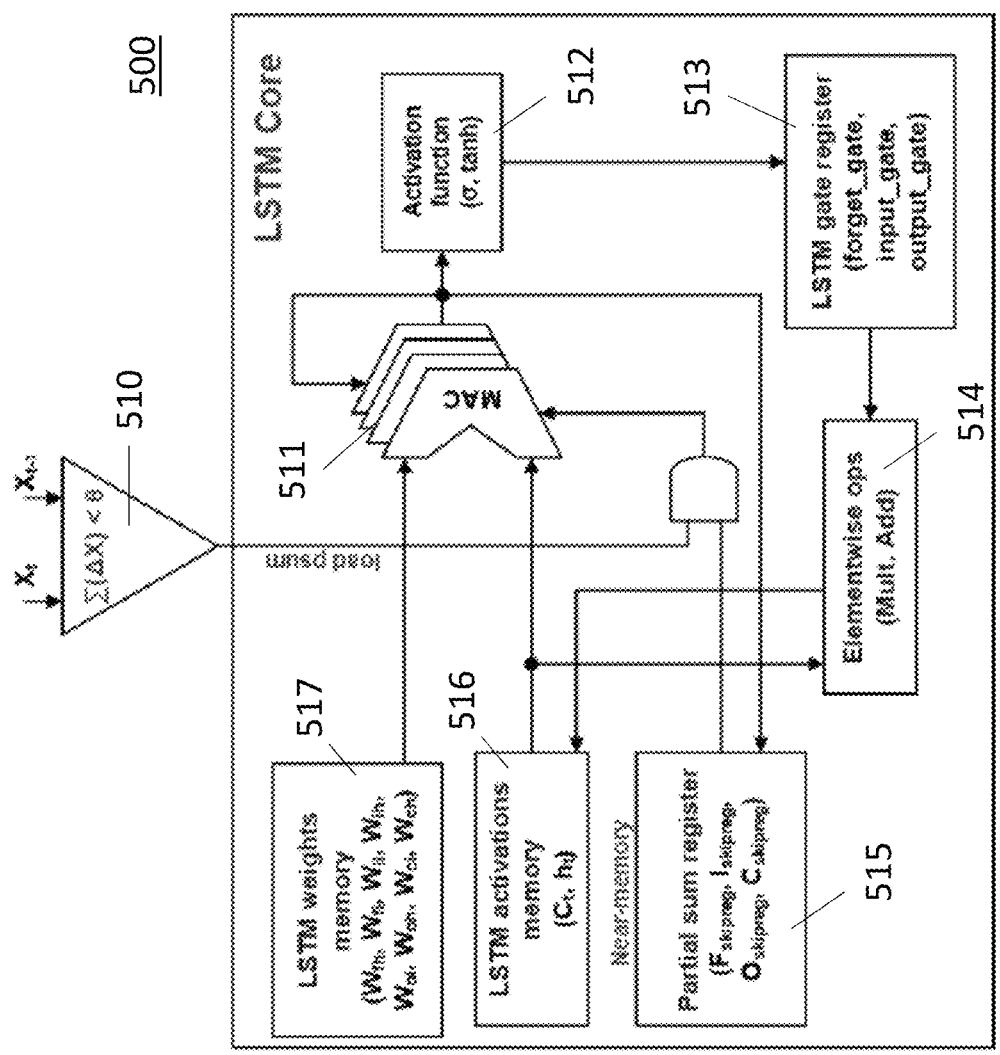
FIG. 5 shows another improved LSTM circuit that utilizes the MAC circuit of FIG. 3.

FIG. 5 shows an LTSM cell circuit design 500 that conforms to the LSTM cell re-use approach described just above and that uses the improved MACs that can rely on a previously stored $(W_{ki})(x_t)$ product term. Here, MAC array 511 corresponds to the four MACs that are each capable of relying on a stored $(W_{ki})(x_t)$ product term if the accumulation total is less than the threshold, or, can explicitly multiply the $(W_{ki})(x_t)$ product term if the accumulation total is more than the threshold. Circuit 510 is the accumulation and comparison circuit that accumulates differences between consecutive input values and compares the accumulation against the threshold.

The stored $(W_{ki})(x_t)$ product terms for each MAC are kept in memory 515. As indicated in FIG. 5, the presentation of the stored product terms to the MAC array 511 is gated by the accumulation threshold determination made by the accumulation and comparison circuit 510. For ease of drawing FIG. 5 does not show the write path from each of the MACs in the MAC array 511 to the memory 515 where fresh $(W_{ki})(x_t)$ product terms are stored.

In an embodiment, the threshold circuit 510 is coupled to a register that can be set by software/firmware so the amount of accumulation that will trigger a fresh $(W_{ki})(x_t)$ product term multiplication can be set by a user. The sigmoid functions used to determine the forget, input and output gates and the tan h function that operates on the s3 scalar are implemented, e.g., as look-up tables 512. As can be seen, the forget, input and output gates and the output of the tan h function that operates on s3 are stored in memory 513.

Logic block 514 contains the discrete multipliers and adders that operate outside the MACs and which ultimately generate $C_t$ and $h_t$ (the logic block 514 can include an embedded tan h look-up table or be coupled to block 512 to perform the tan h that is performed on $C_t$. The generated $C_t$ and $h_t$ values are stored in memory 516. Memory 517 contains the weights that are used by the MACs to generate the product terms of the scalars the MACs calculate.

Figure 6A:
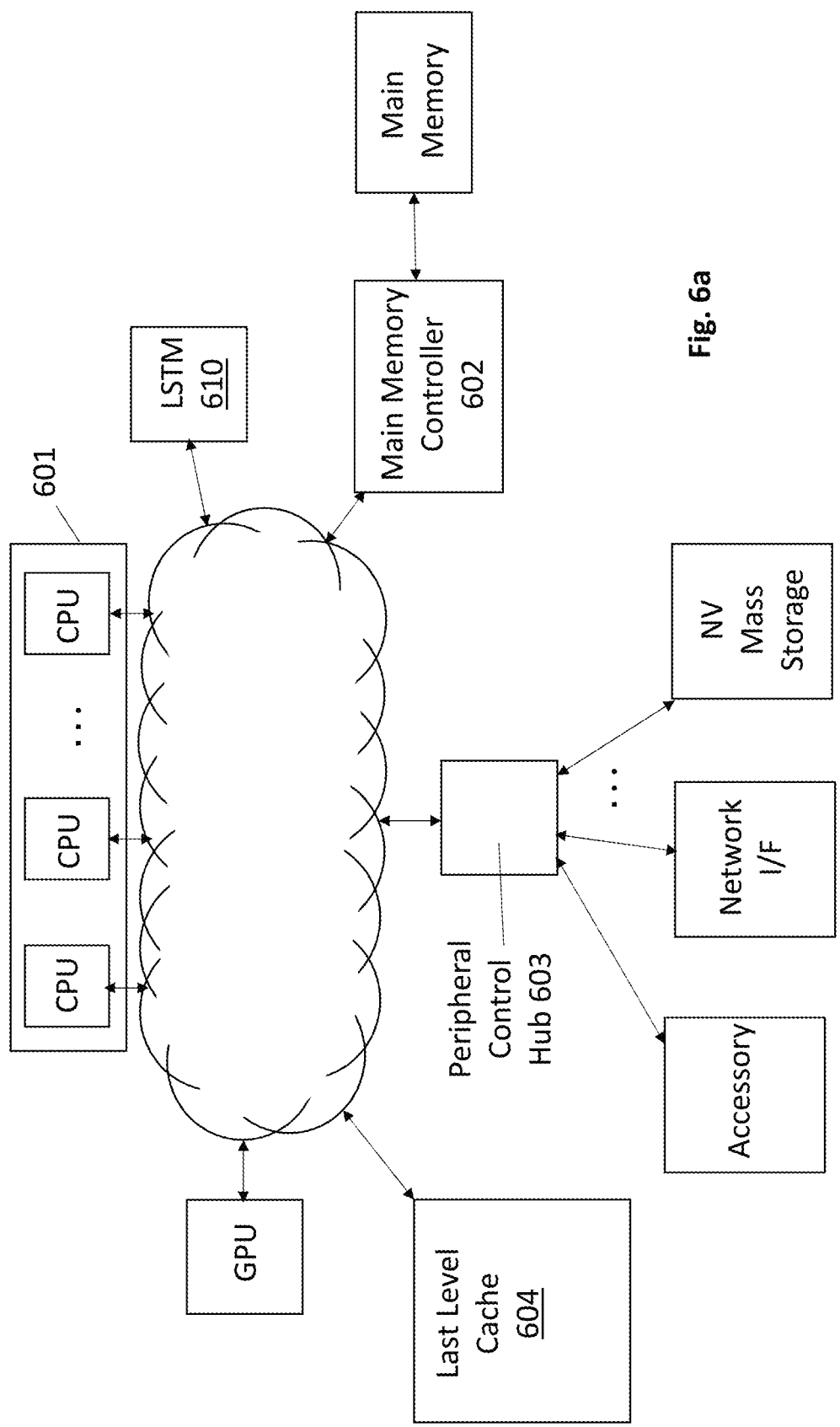
FIGS. 6a and 6b depict different implementations of a RNN and/or LSTM circuitry.
Figure 6B:
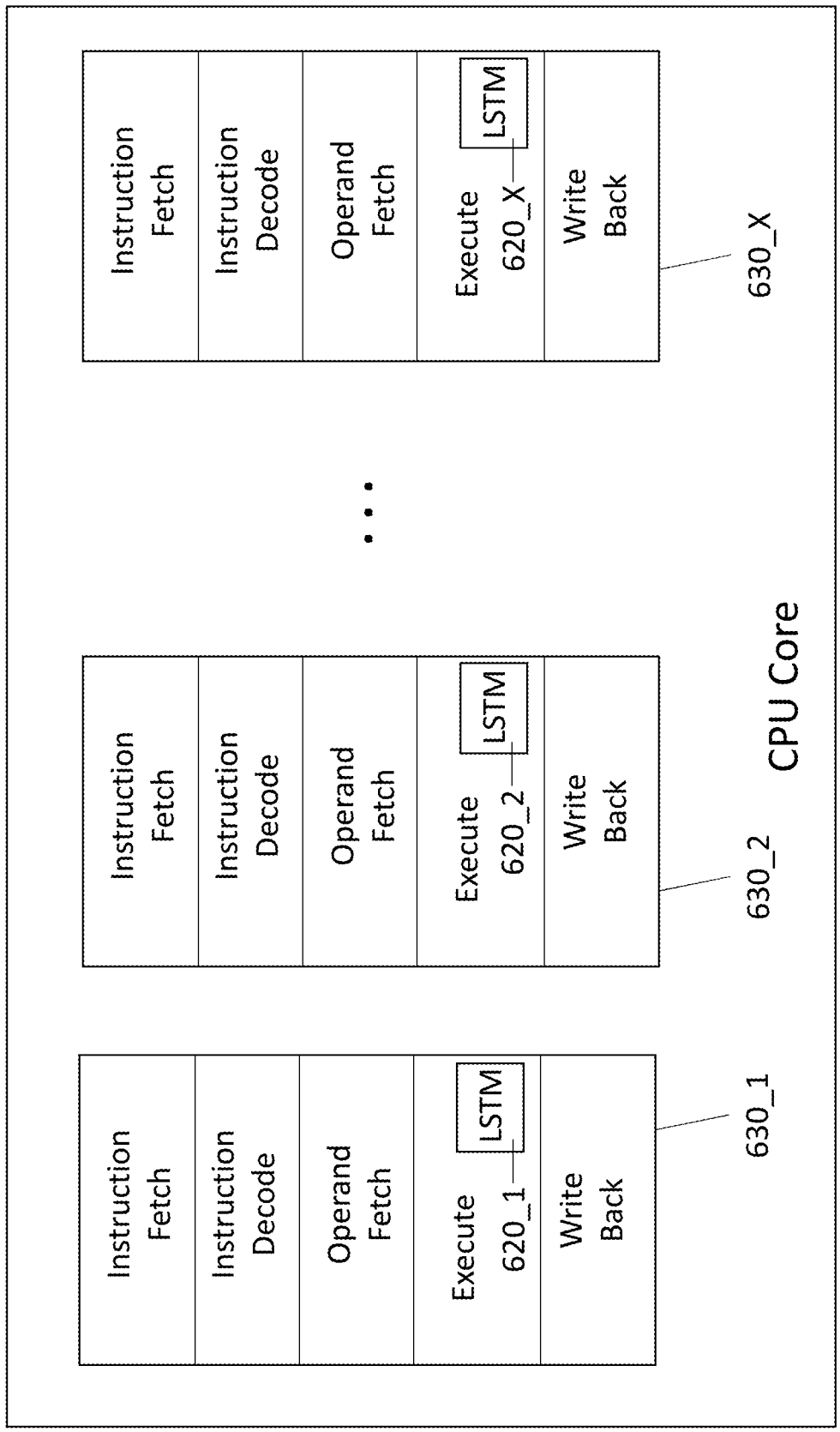

FIGS. 6a and 6b show different embodiments by which one or more LSTM cells as described above for implementing, e.g., a recurring neural network in electronic circuitry, e.g., for artificial intelligence applications may be integrated into a computing system. FIG. 6a shows a first approach in which the LSTM cells 610 is integrated as an accelerator or co-processor to the processor's general purpose CPU processing core(s) 601. Here, an application software program that is executing on one or more of the CPU cores 601 may invoke an artificial intelligence function.

The invocation of the artificial intelligence function may include, e.g., an invocation command that is sent from a CPU core that is executing a thread of the application and is directed to the LTSM cell(s) 610 (e.g., the invocation command may be supported by the CPU instruction set architecture (ISA)). The invocation command may also be preceded by or may be associated with the loading of configuration information into the accelerator hardware 610.

Such configuration information may, e.g., define weights and/or threshold values to be used by the LSTM cell(s). The configuration information may be loaded from system main memory and/or non-volatile mass storage.

In various embodiments, the CPU cores 610, main memory controller 602, peripheral control hub 603 and last level cache 604 are integrated on a processor semiconductor chip. The hardware accelerator 610 may be integrated on the same processor semiconductor chip or may be an off-chip accelerator. In the case of the later, the hardware accelerator 610 may still be integrated within a same semiconductor chip package as the processor or disposed on a same interposer with the processor for mounting to, e.g., a larger system motherboard. Further still the accelerator 610 may be coupled to the processor over some kind of external connection interface (e.g., PCIe, a packet network (e.g., Ethernet), etc.).

In an alternate embodiment, the accelerator 610 is an RNN accelerator unit that includes the LSTM cell circuitry. Invoking the RNN accelerator causes an entire RNN to be executed (e.g., by looping multiple times through an LSTM cell circuit.

FIG. 6b shows another embodiment in which a LSTM execution unit 620 (also referred to as functional unit) that includes the LSTM cell(s) described at length above is added to the execution units (or functional units) of the instruction execution pipeline(s) 630 of a general purpose CPU processing core. FIG. 6b depicts a single CPU core having multiple instruction execution pipelines 630 where each instruction execution pipeline is enhanced to include an LSTM execution unit 620 for supporting neural network/artificial intelligence processing (for simplicity the traditional execution units used to support the traditional ISA are not shown). Here, the ISA of each instruction execution pipeline may be enhanced to support an instruction that invokes the LSTM execution unit. The execution of the LSTM instruction may be similar to the invocation of the LSTM accelerator described just above with respect to FIG. 6a although on a smaller scale.

In an alternate embodiment, the functional unit is an RNN execution unit that include the LSTM cell circuitry. Execution of the RNN instruction causes an entire RNN to be executed (e.g., by looping multiple times through an LSTM cell circuit.

Figure 7:
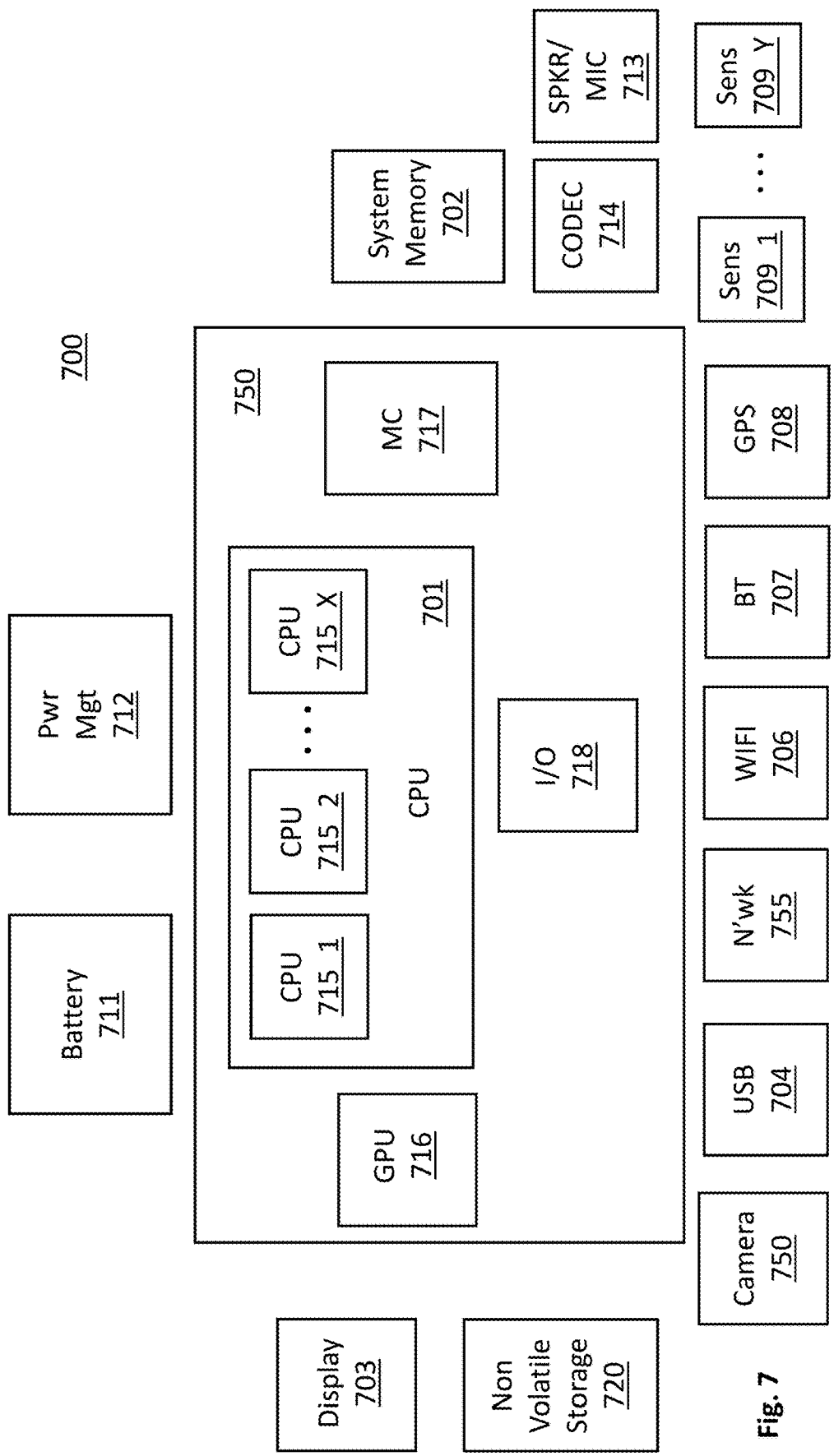
FIG. 7 shows a computing system.

FIG. 7 provides an exemplary depiction of a computing system 700 (e.g., a smartphone, a tablet computer, a laptop computer, a desktop computer, a server computer, etc.). As observed in FIG. 7, the basic computing system 700 may include a central processing unit 701 (which may include, e.g., a plurality of general purpose processing cores 715_1 through 715_X) and a main memory controller 717 disposed on a multi-core processor or applications processor, system memory 702, a display 703 (e.g., touchscreen, flat-panel), a local wired point-to-point link (e.g., USB) interface 704, various network I/O functions 705 (such as an Ethernet interface and/or cellular modem subsystem), a wireless local area network (e.g., WiFi) interface 706, a wireless point-to-point link (e.g., Bluetooth) interface 707 and a Global Positioning System interface 708, various sensors 709_1 through 709_Y, one or more cameras 710, a battery 711, a power management control unit 712, a speaker and microphone 713 and an audio coder/decoder 714.

An applications processor or multi-core processor 750 may include one or more general purpose processing cores 715 within its CPU 701, one or more graphical processing units 716, a memory management function 717 (e.g., a memory controller) and an I/O control function 718. The general purpose processing cores 715 typically execute the operating system and application software of the computing system. The graphics processing unit 716 typically executes graphics intensive functions to, e.g., generate graphics information that is presented on the display 703. The memory control function 717 interfaces with the system memory 702 to write/read data to/from system memory 702. The power management control unit 712 generally controls the power consumption of the system 700.

Each of the touchscreen display 703, the communication interfaces 704-707, the GPS interface 708, the sensors 709, the camera(s) 710, and the speaker/microphone codec 713, 714 all can be viewed as various forms of I/O (input and/or output) relative to the overall computing system including, where appropriate, an integrated peripheral device as well (e.g., the one or more cameras 710). Depending on implementation, various ones of these I/O components may be integrated on the applications processor/multi-core processor 750 or may be located off the die or outside the package of the applications processor/multi-core processor 750. The computing system also includes non-volatile mass storage 720 which may be the mass storage component of the system which may be composed of one or more non-volatile mass storage devices (e.g. hard disk drive, solid state drive, etc.).

The computing system may contain an LSTM circuit, e.g., to compute RNNs, as described at length above.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hard interconnected logic circuitry or programmable logic circuitry (e.g., field programmable gate array (FPGA), programmable logic device (PLD)) for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
a multiply-add circuit, the multiply-add circuit comprising multiplier circuitry to determine first and second product terms for a time increment, the multiply-add circuit comprising an adder circuit to add the first and second product terms for the time increment, the multiply-add circuit comprising circuitry to use a stored product term for one of the product terms, rather than calculate the one product term, if an accumulation of differences between consecutive, preceding input values for the one product term has not reached a threshold, wherein, the multiplier circuitry explicitly calculated the stored product term for a preceding time increment.

2. The apparatus of claim 1 wherein the multiply-add circuit is coupled to a sigmoid function block circuit.

3. The apparatus of claim 2 wherein the sigmoid function block circuit is to determine any of a forget, input and output gate of a long short term memory (LSTM) circuit.

4. The apparatus of claim 1 wherein the multiply-add circuit is coupled to a tan h function block circuit.

5. The apparatus of claim 4 wherein an output of the tan h function block circuit is coupled to second multiplier circuitry, the second multiplier circuitry to multiply an output from the tan h function block circuit and an input gate value of a long short term memory (LSTM) circuit.

6. The apparatus of claim 1 wherein the multiplier circuitry is serial multiplier circuitry that is to execute respective multiplications for the first and second product terms over a series of cycles within the multiply-add circuit.

7. The apparatus of claim 1 wherein the multiplier circuitry is parallel multiplier circuitry that is to execute respective multiplications of the first and second product terms in parallel.

8. The apparatus of claim 1 wherein at least one of a memory and a register is to store the stored product term.

9. The apparatus of claim 8 wherein the multiply-add circuit is embedded within an instruction execution pipeline.

10. The apparatus of claim 1 wherein the apparatus further comprises a register to store the threshold value.

11. A computing system, comprising:
a plurality of processing cores;
a network interface;
a main memory;
a main memory controlled coupled between the main memory and the plurality of processing cores; and,
an accelerator, the accelerator comprising a multiply-add circuit, the multiply-add circuit comprising multiplier circuitry to determine first and second product terms for a time increment, the multiply-add circuit comprising an adder circuit to add the first and second product terms for the time increment, the multiply-add circuit comprising circuitry to use a stored product term for one of the product terms, rather than calculate the one product term, if an accumulation of differences between consecutive, preceding input values for the one product term has not reached a threshold, wherein, the multiplier circuitry explicitly calculated the stored product term for a preceding time increment.

12. The computing system of claim 11 wherein the multiply-add circuit is coupled to a sigmoid function block circuit.

13. The computing system of claim 12 wherein the sigmoid function block circuit is to determine any of a forget, input and output gate of a long term short memory (LTSM) circuit.

14. The computing system of claim 11 wherein the multiply-add circuit is coupled to a tan h function block circuit.

15. The computing system of claim 14 wherein an output of the tan h function block circuit is coupled to second multiplier circuitry, the second multiplier circuitry to multiply the output of the tan h function block circuit and an input gate value of a long term short memory (LTSM) circuit.

16. The computing system of claim 11 wherein at least one of a memory and a register is to store the stored product term.

17. The computing system of claim 11 wherein the accelerator further comprises a register to store the threshold value.

18. The computing system of claim 11 wherein the accelerator comprises a recursive neural network circuit, wherein, the recursive neural network circuit comprises the multiply-add circuit.

* * * * *